April 15, 1958    H. ST. PIERRE    2,830,558
RACK AND TROUGH ANIMAL FEEDER
Filed Dec. 30, 1953

INVENTOR.
HENRY ST. PIERRE
BY
Charles R. Fay, atty.

United States Patent Office 2,830,558
Patented Apr. 15, 1958

2,830,558

RACK AND TROUGH ANIMAL FEEDER

Henry St. Pierre, Worcester, Mass.

Application December 30, 1953, Serial No. 401,331

1 Claim. (Cl. 119—58)

This invention relates to a new and improved portable animal feeder which is particularly adapted for feeding cattle in the field.

The principal object of the invention resides in the provision of a very sturdy but portable framework adapted to rest upon the ground and including uprights and horizontals which support a network of chains which extends in generally horizontal relationship but sags to an extent convenient for the cattle to be able to eat fodder held and supported in the chain network.

Another object of the invention resides in the provision of an animal feeder as above described including a movable cover for protection against weather and for preventing the fodder from blowing out, said cover being easily opened for the purpose of depositing additional amounts of feed to be stored by the chain network.

Another object of the invention resides in the provision of the animal feeder above described including a new and improved trough located in spaced relation below the chain network and in a position to catch all of the fodder dropped by the animals, preventing the same dropping upon the ground and becoming useless by reason of being trampled upon as would otherwise be the case; the provision of a trough as above described which is made as a continuous sheet of material having edge flanges resting upon side rails forming a part of the feeder itself and located on and between the uprights; and the provision of a trough as described made in two pieces, each of which is made in general V-shape, one side, however, being lower than the other and each side edge thereof being provided with flanges which rest upon the side rails and also upon a central rail secured to the framework in a position below the side rails so as to improve the trough and render all parts thereof accessible to animals so that all of the feed is either consumed directly from the chain network or from the double trough described.

Other objects and advantages of the invention will appear hereinafter.

Reference is to be had to the accompanying drawings, in which

The present device is relatively sturdy and rigid and although it is of substantial weight, it is portable and may be transported from place to place by tractor or truck. The device is provided with four strong and relatively heavy uprights indicated at 10, and these may rest upon the ground or upon skids 12. Side rails 14 connect the uprights at the long sides of the device and end rails 16 are provided to space the uprights and to strengthen the frame. Suitable bracing indicated at 18 may also be employed to help in preventing the cattle from damaging the feeder as would otherwise be the case, since the animals will clearly crowd around and press closely into the feeding device in order to get at the fodder.

The uprights are provided with an open continuous frame generally indicated at 20 and this may comprise beams or the like secured to the framework in a manner similar to the rails 14 and 16. The framework 20 provides a support for a reticulated chain network which extends across this frame and is secured thereto at the interior aspect thereof.

Figure 1:
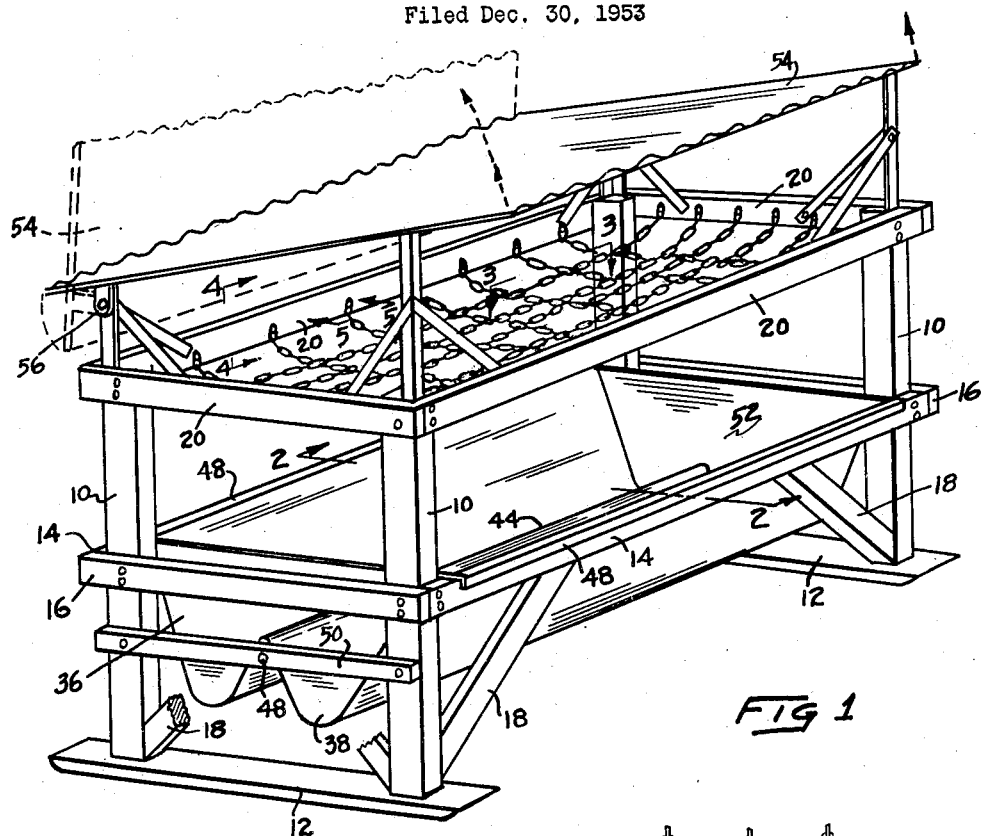
Fig. 1 is a perspective view of an animal feeder according to the invention.
Figure 2:
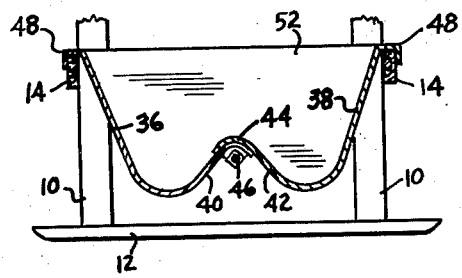
Fig. 2 is a section on line 2—2 of Fig. 1.
Figure 3:
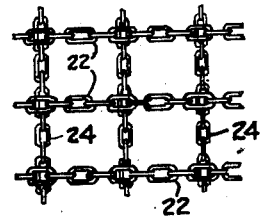
Fig. 3 is an enlarged view illustrating the chain network construction.

The chain comprises two series of crossing chains, each series being made up of spaced parallel chains indicated at 22 and 24 respectively. Each of these chains is made up of a length of flat links, certain links of which cross each other as clearly shown in Fig. 3, these crossing links being welded together and forming a unitary network which is intended to sag to a slight extent from its frame 20 so as to provide convenient means for the cattle from underneath to reach the fodder which is supported upon the network and inside of frame 20.

Figure 5:
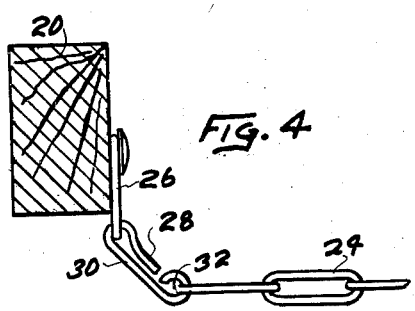
Fig. 5 is a view in elevation showing a modification of a part of the chain construction.
Figure 4:
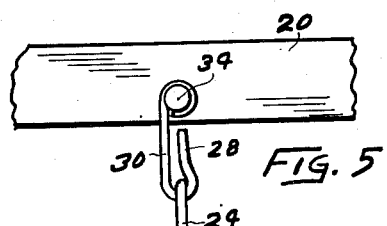
Fig. 4 is a section on an enlarged scale on line 4—4 of Fig. 1.

The respective chains 22 and 24 extend beyond the connections thereof to the other series to form connecting means to the framework 20 and this may be done in two different ways, see Figs. 4 and 5. In Fig. 4, a plain chain link 26 is secured to the inner edge of the frame 20 and to this link there is applied the elongated point 28 of an elongated hook 30 having an eye at 32 for attachment to the terminal link on any of the chains.

If desired, however, the links 30 may be directly secured to frame 20 by fasteners 34 and in this case the terminal links of each chain are slipped over the elongated points 28 to hold the chain network in desired position.

This construction provides a relatively simple and inexpensive but extremely rugged and long-lasting frame and network of chains for feeding cattle in the field. The feed will not be spread outside of the area of the device although some of the feed will be dropped in the area thereof. To prevent waste of this there is provided a trough which extends across the entire area of the device and catches dropped fodder. This trough is made so that such dropped fodder will be easily picked up by the animals and therefore there will be no loss of animal feed in the use of the present device.

The trough referred to is composed of two parts which are made of continous sheets indicated at 36, 38. These are both in the form of a V but the trough portion 36 has a right-hand short leg 40 and the trough part 38 has a left-hand short leg 42, one of which is provided with a right angle bend indicated at 44 disposed over a rail 46 secured as at 48 to a cross-piece 50 parallel to but below the end rail 16. The long legs of the respective trough parts 36 and 38 are provided with flanges 48 which are disposed over the corresponding rails 14 and it will be seen that the entire trough is thus held in position by said flanges 48 and the end rails. Solid end walls 52 may be provided or these may be left open if desired.

At the top of the device there is provided a lightweight cover member 54 which may be hinged as at 56 to be moved between the weather-protecting position shown in solid lines or the open position shown in dotted lines, wherein the chain network may easily receive a load of fodder when required to be replenished.

This invention is seen to provide a relatively simple but strong, sturdy and long-lasting field feeder particularly adapted for cattle and other domestic animals. The same may be moved from place to place where required and it is easily serviced insofar as applying the fodder thereto is concerned. Also none of such fodder is lost because of the novel trough construction and the cattle normally pull the fodder down from the chain network and when they drop any of it into the trough, they will clean it up easily and quickly.

Having thus described my invention and the advantages thereof, I do not wish to be limited to the details herein disclosed, otherwise than as set forth in the claim, but what I claim is:

A portable feeding device of the class described comprising uprights and connecting side rails, braces between the uprights and rails, said uprights extending above the rails, a substantially continuous open frame on the uprights above the rails in spaced relation thereto, a generally horizontal but sagging chain network secured to the frame and a trough mounted on the rails and extending across the device below the chain network, said trough comprising a sheet of material in general V form, a flange on the sheet at each edge thereof, one flange being disposed to rest on a rail, a central rail on the device between the side rails, the other flange resting on the central rail, a second sheet in V form, flanges thereon, one of the last-named flanges being positioned on the other side rail and the other flange being positioned on the central rail in overlapping relation to the flange thereon.

References Cited in the file of this patent
UNITED STATES PATENTS

| | | |
|---|---|---|
| 872,032 | Tolle | Nov. 26, 1907 |
| 980,789 | Jeffery | Jan. 3, 1911 |
| 1,016,479 | Coyne et al. | Feb. 6, 1912 |
| 1,184,147 | Talcott | May 23, 1916 |
| 1,366,052 | Bettenga | Jan. 18, 1921 |
| 1,593,502 | Miller | July 20, 1926 |
| 1,593,503 | Miller | July 20, 1926 |
| 1,895,162 | Jensen | Jan. 24, 1933 |
| 2,500,889 | Winkler | Mar. 14, 1950 |
| 2,686,494 | Garman | Aug. 17, 1954 |

FOREIGN PATENTS

| | | |
|---|---|---|
| 2,332 | Great Britain | 1880 |
| 666,756 | Great Britain | Feb. 20, 1952 |